United States Patent [19]
Godsey et al.

[11] 4,136,428
[45] Jan. 30, 1979

[54] METHOD FOR PRODUCING IMPROVED HEAT TRANSFER SURFACE

[75] Inventors: Randall D. Godsey, Palatine; Roy E. Svacha, North Barrington; James V. Crawford, Barrington Hills; Kenneth R. Janowski, Wheaton, all of Ill.

[73] Assignee: UOP Inc., Des Plaines, Ill.

[21] Appl. No.: 867,858

[22] Filed: Jan. 9, 1978

[51] Int. Cl.² ............................................. B23P 15/26
[52] U.S. Cl. ................................... 29/157.4; 29/459;
165/133; 138/144; 138/145; 138/146;
138/DIG. 9; 427/228; 427/247; 427/244;
427/373; 427/276; 427/257; 427/178; 427/202;
427/227
[58] Field of Search ............... 29/458, 459, 460, 157.4;
165/133; 138/144, 145, 146, DIG. 9; 427/243,
244, 247, 373, 178, 227, 228, 202, 276, 257

[56] References Cited
U.S. PATENT DOCUMENTS

| 3,082,611 | 3/1963 | Alvis et al. | 165/133 |
| 3,979,818 | 9/1976 | Groch et al. | 29/458 |
| 3,990,862 | 11/1976 | Dahl et al. | 165/133 |
| 4,075,376 | 2/1978 | Jaeger | 138/145 |

OTHER PUBLICATIONS

Trans. Inst. Met. Finishing, 1954, 31, 517–526, "The Electro-deposition of Porous Metal," by Faust et al.

Primary Examiner—C. W. Lanham
Assistant Examiner—V. K. Rising
Attorney, Agent, or Firm—James R. Hoatson, Jr.; Barry L. Clark; William H. Page

[57] ABSTRACT

The invention relates to a method of improving the heat transfer properties in boiling liquids of tubes and other surfaces by applying a very porous reticulated organic foam layer which has been precoated with graphite in contact with the tube surface, and then plating a thin metal coating on the foam substrate. Preferably, the tube is copper and the plating consists of an electroplated layer of copper which is applied over the conductive graphite coated foam. the foam is preferably in the form of a thin tape which is spirally wound about the tube. Pyrolyzation of the foam after plating improves the heat transfer performance of the tube. A method for applying the graphite to the foam is also disclosed.

8 Claims, 7 Drawing Figures

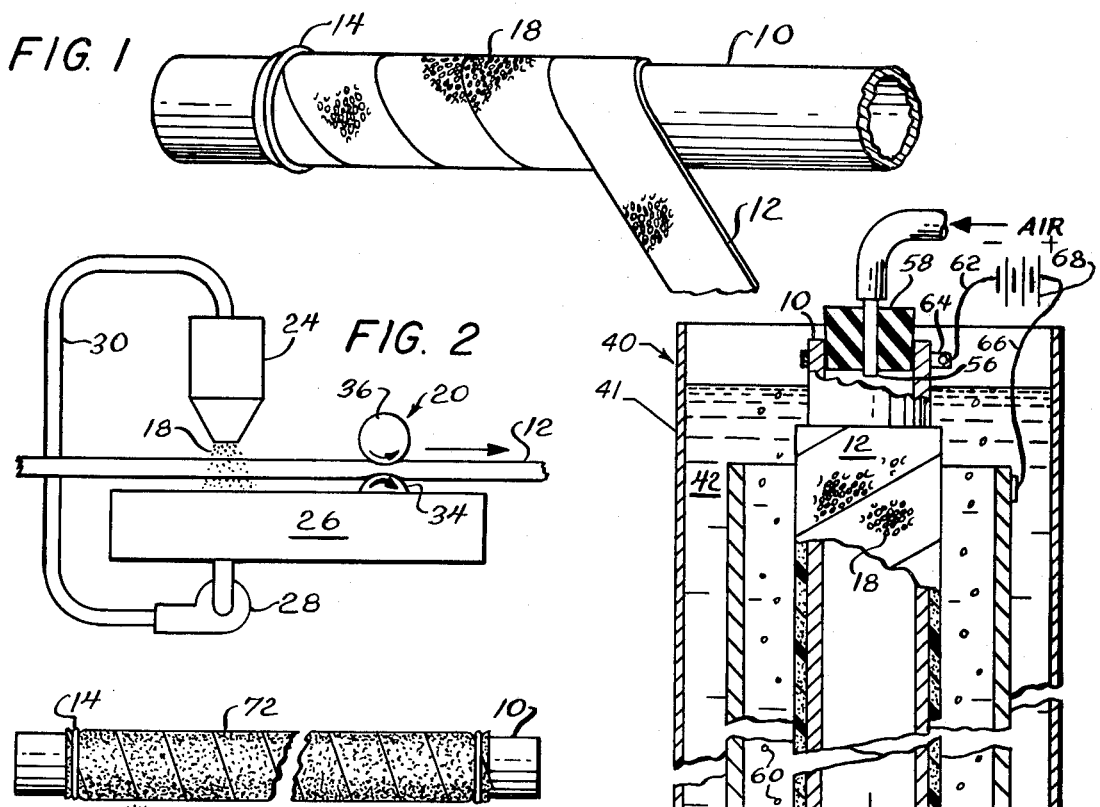
FIG. 1
FIG. 2
FIG. 3
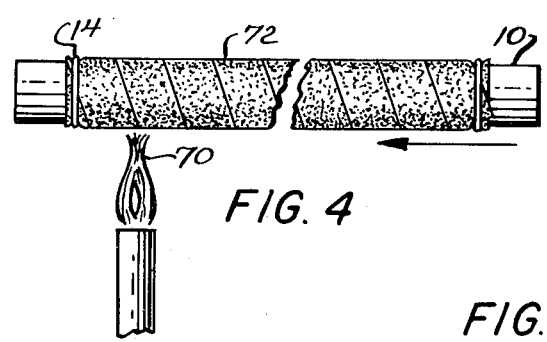
FIG. 4
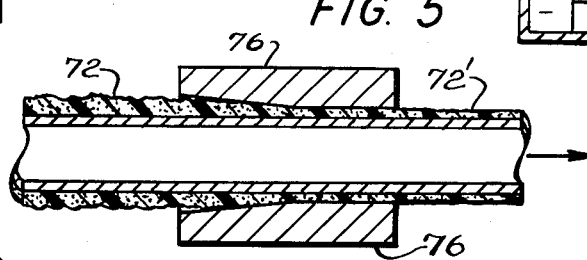
FIG. 5
FIG. 6
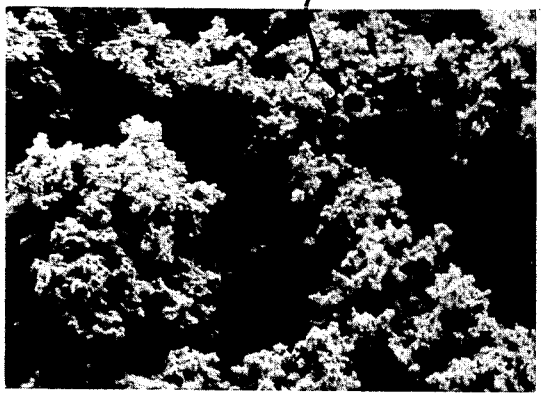
FIG. 7
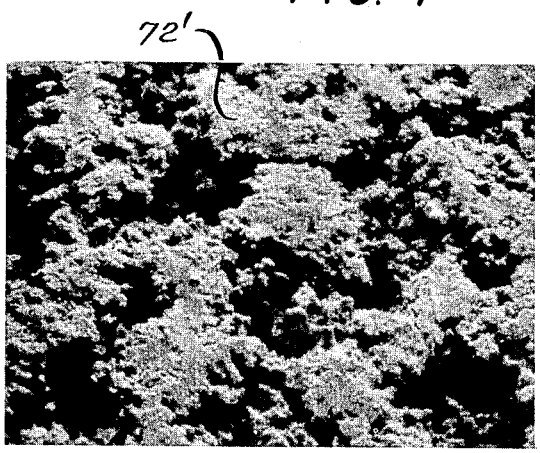

METHOD FOR PRODUCING IMPROVED HEAT TRANSFER SURFACE

CROSS-REFERENCE TO RELATED APPLICATIONS

The disclosed method is related to the method disclosed in co-pending application Ser. No. 769,623, filed Feb. 16, 1977, and assigned to a common assignee.

BACKGROUND OF THE INVENTION

Improved heat transfer tube technology in recent years has been highly dependent upon the improvement of two phase heat transfer, that is the transfer of thermal energy due to the phase transformation from the liquid to the vapor phase. The methods to improve this two phase heat transfer include both passive and active techniques. Passive techniques include surface treatments, roughening the surface, extending the surfaces, displaced enhancement, swirl flow techniques, alteration of surface tension, and the inclusion of additives to the coolant. Active techniques include mechanical aids, surface vibration, fluid vibration, and the addition of electrostatic fields.

In the area of treated surfaces, various materials are deposited on the heat transfer tube surfaces to promote boiling. Such materials have included Teflon, tube surface oxides, and the addition of high surface copper powder. These surface treatments improve the wettability of the surface and result in a low wall super heat which eliminates boiling curve hysteresis.

Surface roughening is a technique to provide a large number of nucleation sites on the tube surfaces. The technique involves the mechanical deformation of the surface to provide a large number of reentrant cavities.

Extended surface tubes are produced by finning techniques which yield high external surface areas to the tube and allow very large heat transfer rates if the base temperature is in the film boiling range; however, nucleate boiling is not promoted with this type of heat transfer tube.

Displaced enhancement techniques promote boiling by taking advantage of hydrodynamic instability in the coolant when open structures are placed directly above the heat transfer surface.

Surface tension devices operate on the wicking principle which relies on capillary forces while the addition of additives to the coolant affects the wettability of the coolant to the heat transfer tube.

A number of mechanical boiling aids have been proposed including rotating of the boilers themselves, the introduction of rotating plates, and the introduction of bubbles into the vicinity of the heat surface.

The purpose of vibrating either the fluid or the surface is to form localized nucleate boiling sites due to pressure variations in the liquid. The use of electrostatic fields improves mixing within the coolant and is used principally with poorly conducting or dielectric fluids.

Of the above techniques, those that promote nucleate boiling are of principal interest from a technological viewpoint. The theory of nucleate boiling has been well developed and is well understood at this point. The variables that are involved in promoting vapor phase nucleation are well understood. The parameters of importance in a nucleate boiling tube-coolant system include the specific heat of the liquid, the specific heat of the tube material, the heat transfer coefficient, the latent heat of vaporization, the thermal conductivity of the liquid and the heater tube, the geometry of the nucleation site, the temperature of the coolant, vapor, and surface, the liquid viscosity, the surface tension, and the densities of the liquid and vapor phases.

The nucleate boiling phenomenon involves two separate operations. The first of these is the nucleation of the vapor phase within the liquid while the second is the subsequent growth of the vapor phase to form bubbles within the liquid. It has been postulated that improved efficiency of heat transfer can be attained when the nucleation process does not have to be continuously redone. This nucleation process requires a large amount of superheating. Improved efficiency can be observed if the thermal energy is transferred by the growth of pre-existing vapor phase nuclei. This approach has resulted in the specification of re-entrant cavities as highly effective nucleate boiling sites.

A number of patents have been issued whereby the surface of a heat transfer tube is mechanically altered to provide these re-entrant sites. These include Ware U.S. Pat. No. 3,326,283, Kun et al U.S. Pat. No. 3,454,081, Szumigala U.S. Pat. No. 3,566,514, Thorne U.S. Pat. No. 3,881,342, and Kakizaki et al U.S. Pat. No. 3,906,604. While all of the above patents propose the improvement of nucleation by the mechanical introduction of nucleation sites, they all suffer from the common characteristic of having a relatively few number of nucleation sites per given area of tubing surface. This limitation is imposed by the manufacturing tooling required to produce the tubes, and is an inherent limitation for any mechanically produced tube.

The demonstrated heat transfer capability of a tube produced with a much higher density of nucleation sites is covered in Milton U.S. Pat. No. 3,384,154. This tube is of the treated surface variety mentioned above where copper powder particles are sintered to the surface of the heat exchanger tube. This provides a very high density of nucleation sites on the tube surface and allows retention of the vapor phase throughout the open pore structure of the sintered surface.

This sintered surface tube, while an effective boiling surface and heat transfer tube, suffers from manufacturing difficulties. The copper powder is mixed with an organic binder and sprayed onto the tube surface for ease of handling. The coated tube is then subjected to a high temperature exposure. This decomposes the organic binder and sinters the copper particles together as well as to the base tube. The Milton patent states the sintered temperature to be about 1760° F. which is about 180° F. below the melting point of copper. This temperature treatment is not only difficult to do but can result in serious degradation of the mechanical properties of the base tube. The degradation problems can be minimized by utilizing alloys whose superior recrystallization and grain growth characteristics will reduce the amount of property degradation but such alloys introduce added cost and have lower thermal conductivity.

Albertson U.S. Pat. No. 4,018,264 discloses a tube with improved nucleate boiling performance as compared to a standard finned tube which is made by initially plating the tube at high current density to form spaced dentrites or nodules which are then further plated at lower current densities and physically deformed.

SUMMARY

It is among the objects of the present invention to provide an improved heat transfer surface and a method of making same which will produce a very high density of nucleation sites at a relatively low cost and without affecting the properties of the base tube. These and other objects are achieved by the method of the present invention which involves the coating of a heat transfer surface with a reticulated, conductive, open cell organic foam such as graphite coated polyurethane. The foam can be in the form of a thin strip or tape that is spirally wound around the base tube or it can be in a tubular shape which could be slipped over the tube. The foam coating can also be directly applied to the tube surface if it is foamed in such a manner as to leave open cells rather than a closed cell skin in contact with the base tube. The open celled nature of the foam allows free and easy excess of the coolant all the way to the tube surface and is more resistant to having its nucleation sites blocked by foreign objects in the plating solution than would be the case for a sintered surface tube. The geometries of the nucleation sites within the foam can be easily controlled by the foam formulation as is well understood.

The reticulated foam comprises a substrate upon which copper is plated after the foam has been made conductive. The initial step is to apply a graphite coating to the foam which will adhere sufficiently well to make the surface of the organic foam electrically conductive. Standard electroplating of copper is then used to plate the coated foam and the portions of the tube which are not contacted by the foam and to build the thickness of the copper coating up to the point where it has structural integrity. After plating, the organic precursor can be pyrolyzed if desired.

In making experimental tubes we used a reticulated polyurethane foam sold as Scott Industrial Foam by Scott Paper Company and having a 97% void volume with a pore size controlled at 100 pores per linear inch. For the experimental tubes, strips approximately 1 inch wide by 0.062 inch thickness were wrapped in a spiral fashion along the length of the base tube and mechanically held in place by an elastic band during the plating operations. The foam was previously made conductive by drawing it through a container of finely divided graphite powder and then passing it through the roll nip of a shear mill wherein the different surface speeds of rotation of the work engaging rollers forced the graphite particles into relatively firm contact with the reticulated foam structure. A graphite powder having a mesh size of less than 200 sold by the Joseph Dixon Crucible Co. of Jersey City, N.J., under the formula number 8485 performed satisfactorily. The tube was then electroplated in an air agitated standard copper sulfate electroplating solution using a copper electrode and a DC voltage. Electroplating was continued until a sufficiently thick copper electrodeposit was formed so that the foam had sufficient strength to allow normal handling. The plating conditions were 1.65 volts and 10.0 amps for 142 minutes, resulting in a copper electrodeposit of 24.17 g for the 12" long sample tube. Measurement of the plating thickness is extremely difficult but the thickness appeared to be about 0.0004–0.0006".

Heat transfer testing of an as-plated tube in Refrigerant R-11 showed a considerable improvement in the surface nucleation boiling characteristics of this tube as compared to a standard fin tube. The boiling characteristics were also superior to a commercially available nucleate boiling tube produced by mechanical means in accordance with the aforementioned Kakizaki patent. Observation of the surface boiling characteristics when compared with a length of tubing as produced in accordance with the Milton patent showed that nucleation on the foam surface was quite close to that produced by the sintered copper surface.

The effect of pyrolysis of the polyurethane foam on surface structure and boiling characteristics was then determined. The plated foamed tube was held in a laboratory gas flame until pyrolysis of the graphite coated polyurethane substrate was complete. Optical and scanning electron microscopy of the remaining copper foam showed a series of very small pores along the surfaces of the skeletal copper remaining after the pyrolysis of the substrate. These pores varied in size with a maximum of about 0.002 inches in their largest dimension. The pores were probably produced by the pressure of the gases created during the pyrolysis of the organic substrate which fracture the thin plated walls which encapsulate the organic substrate.

Boiling tests of the pyrolyzed tube in the same R-11 coolant as used previously indicated superior performance of the pyrolyzed tube as compared to the tube before pyrolysis. This is undoubtedly due to the large number of very tiny vapor phase nucleation sites resulting from the porosity due to the pyrolysis. Since the polyurethane can be pyrolyzed at temperatures in the range of 575–900° F. it is obvious that the degradation problems which can take place at temperatures closer to the melting point of copper are of little consequence.

BRIEF DESCRIPTION OF THE DRAWINGS

FIG. 1 is a perspective view showing a thin strip of reticulated foam being wound about a plain tube;

FIG. 2 is a side view illustrating the application of graphite particles to a foam strip and the passage of the strip through a shear mill;

FIG. 3 is a side sectional view showing the tube of FIG. 1 being electroplated;

FIG. 4 is a side view of a tube which has been wrapped with foam and then plated being passed over a flame to pyrolyze the foam;

FIG. 5 is a side view showing the pyrolyzed tube of FIG. 4 having its plated surface compressed in a swaging die;

FIG. 6 is a 100× SEM photograph showing the tube after plating; and

FIG. 7 is a 100× SEM photograph showing the tube of FIG. 4 after being swaged.

DESCRIPTION OF THE PREFERRED EMBODIMENT

Referring to FIG. 1, a tube 10, preferably of copper, is shown. The first step in providing the tube 10 with an improved nucleate boiling surface is illustrated and comprises the wrapping of a thin strip of reticulated polyurethane foam 12 about the tube 10 and anchoring it thereto such as by means of a rubber band 14. The normally non-conductive foam strip 12 is preferably precoated with graphite particles 18 in order that its surface will be conductive.

The graphite particles 18 may be applied to the foam strip 12 in any suitable manner. One example of a suitable apparatus is shown in FIG. 2 where the foam strip 12 is drawn longitudinally through a shear mill 20 after graphite particles 18 have been dropped upon it from a supply hopper 24. Excess particles fall through the foam strip 12 into a collection tray 26 from which they are recirculated to the storage hopper 24 by means of a blower 28 and a tube 30. The shear mill 20 includes a pair of rolls 34, 36 which are of like diameters but which rotate at different speeds so as to exert a shearing action on the foam strip 12, thus causing the particles 18 to become attached thereto. The ratio of the speeds of surface rotation of the lower faster roll 34 to the higher slower roll 36 are approximately 3:4.

FIG. 3 illustrates a side section of a plating apparatus 40 in which the foam wrapped tube of FIG. 1 can be plated. The plating apparatus 40 preferably comprises a vertical plating tank or container 41 which contains a conventional copper plating solution 42, such as one consisting of copper sulfate, sulfuric acid and water. The tube 10 and its conductive foam layer 12 comprise the cathode of the plating apparatus while the anode may comprise a copper tube 44 of larger diameter which surrounds the tube 10 and is preferably evenly spaced from it. The tube 10 is shown as being mounted on a mounting block 48 of plastic or other non-conductive material. The mounting block 48 preferably includes internal passages 50 and is sealed relative to the tube 10 by an 0-ring 52. An air inlet tube 56 mounted in a stopper 58 in the upper end of the tube 10 permits air from a suitable source to be carried to the bottom of the tube 10 so that it can pass through the air passages 50 and bubble up in the form of bubbles 60 through the solution 42 in the region between the tube 10 and the tubular cathode 44. The bubbles 60 agitate the plating solution 42 and provide a more uniform plating. The cathode or tube member 10 is connected by a lead member 62 and a connector or clamp ring 64 to a battery or other DC current souce 68. The anode 44 is connected with a lead member 66 to the battery 68.

FIG. 4 illustrates the step of pyrolyzing the organic foam after it has been plated with a copper surface 72 in the plating apparatus 40. The pyrolysis operation removes the foam but leaves open spaces underneath the copper plating which form pores under the copper surface 72.

FIG. 5 illustrates the step of passing the pyrolyzed tube through a set of swaging dyes 76 to force down the copper surface 72 so that it achieves a smaller outer diameter 72'. The swaged surface provides the advantage of a smaller outer diameter so that tubes can be spaced closer together in a tube bundle. The swaged surface also appears to provide better boiling performance.

FIGS. 6 and 7 are approximately 100× SEM photographs showing the surface of an experimental tube produced in the apparatus of FIG. 3. In FIG. 6, the tube 10 is shown after pyrolysis and illustrates the porous nature of the plated copper surface 72. FIG. 7 illustrates a portion of the same tube after swaging through a 0.640"diameter die 76 in the manner illustrated in FIG. 5. The swaged plated copper surface 72' is compressed so that fewer pores are visible than in FIG. 6 but the underlying pore matrix appears to enhance the nucleate boiling capability of the tube.

We claim as our invention:

1. A method of providing a metal heat transfer member with a porous nucleate boiling surface comprising the steps of applying a layer of open cell reticulated organic foam material having an adherent coating of conductive graphite to the surface of the metal member and electroplating the exposed graphite coated surfaces of the reticulated foam material and the exposed surfaces of the metal member which underlie the foam material with a metal so as to form a reticulated metal surface having open cells which overlies the surface of the metal member and is firmly adhered thereto.

2. The method of claim 1 wherein said graphite coating is applied to said layer of foam material by a shear mill.

3. The method of claim 1 wherein said metal heat transfer member is cleaned before it is plated.

4. The method of claim 1 wherein said metal heat transfer member is heated after it is plated to pyrolyze the organic foam material.

5. The method of claim 1 wherein said heat transfer member is a tube and said layer of graphite coated foam material is applied by spirally wrapping a strip of said foam material about said tube.

6. The method of claim 1 wherein said plating has a thickness in the range of about 0.0004–0.0006 inches.

7. The method of claim 4 wherein said metal plating is made sufficiently thin that portions of it will be fractured by gases developed during pyrolyzation to produce pore openings therein.

8. The method of claim 4 wherein said heating takes place at a temperature of less than about 900° F.

* * * * *